United States Patent [19]

Bateman et al.

[11] Patent Number: 4,886,233

[45] Date of Patent: Dec. 12, 1989

[54] FIRE FIGHTING VENTILATION SYSTEM

[76] Inventors: Donald E. Bateman, 2-747 42nd St.; Barry L. Panter, 2-2985 North 4200 West, both of Ogden, Utah 84044

[21] Appl. No.: 139,777

[22] Filed: Dec. 30, 1987

[51] Int. Cl.[4] .......................................... F16M 13/00
[52] U.S. Cl. .................................... 248/647; 169/91; 248/129; 248/136; 248/649; 248/653; 280/47.33; 280/655
[58] Field of Search ............... 248/647, 649, 653, 654, 248/676, 129, 136, 150; 169/91; 280/47.37, 47.33, 655, 47.24, 30

[56] References Cited

U.S. PATENT DOCUMENTS

| | | | |
|---|---|---|---|
| 1,254,042 | 1/1918 | Howe. | |
| 1,747,600 | 2/1930 | Reardon | 280/47.24 |
| 1,972,654 | 9/1934 | Heath. | |
| 2,521,920 | 9/1950 | Koch | 248/647 X |
| 2,591,669 | 4/1952 | Bucknell et al. | 248/676 X |
| 2,659,042 | 11/1953 | Anderson et al. | 280/47.33 X |
| 2,710,759 | 6/1955 | Bayer et al. | 280/47.33 |
| 2,868,558 | 1/1959 | Krauss | 248/129 X |
| 2,884,075 | 4/1959 | Poon. | |
| 2,891,624 | 6/1959 | McBride. | |
| 2,981,464 | 4/1961 | Omohundro | 248/676 X |
| 3,064,990 | 11/1962 | Salvucci | 280/47.24 |
| 3,165,367 | 1/1965 | Rose | 280/47.33 X |
| 3,827,707 | 8/1974 | Bierman | 280/47.24 X |
| 3,873,118 | 3/1975 | Takagi | 280/47.37 X |
| 3,893,687 | 7/1975 | Victor | 280/47.33 X |
| 4,239,459 | 12/1980 | Felter. | |
| 4,350,366 | 9/1982 | Helms | 280/47.33 X |
| 4,351,209 | 9/1982 | Alford | 248/150 X |
| 4,589,622 | 5/1986 | Hutter | 248/649 |
| 4,640,521 | 2/1987 | Berfield | 248/129 X |

OTHER PUBLICATIONS

Tempest Technology Corporation, Terra Bella, Calif. Fire Fighting and Safety Equipment, Catalog No. M-500, 1969 issue.

Primary Examiner—Ramon S. Britts
Assistant Examiner—David L. Talbott
Attorney, Agent, or Firm—Workman, Nydegger & Jensen

[57] ABSTRACT

An apparatus for transporting and supporting fire fighting ventilation equipment is disclosed. A fan support frame supports one or more ventilation fans thereon. Extending in an upward direction from the fan support frame are a pair of arms whose length may be adjusted. Pivotally attached to each arm near its upward end is a rearwardly extending leg. The length of each of the rearwardly extending legs may be individually adjusted. An adjustable length bracket is provided for each leg and arm combination to hold the two components apart at the desired angular distance. An extendable leg is also provided at the front of the fan support frame. Wheels are provided on the fan support frame so that one or more ventilation fans may be transported by an individual and the fans may be aimed at any angle of inclination by extending the legs so that they contact the surface underlying the apparatus.

27 Claims, 2 Drawing Sheets

FIRE FIGHTING VENTILATION SYSTEM

BACKGROUND

1. The Field of the Invention.

The present invention generally relates to equipment used to fight fires. More particularly, the present invention relates to apparatus used to ventilate enclosed spaces as part of fire fighting or emergency relief efforts.

2. The Background Art.

Modern fire fighters use a variety of equipment and techniques during an effort to extinguish any particular fire. The familiar water hoses and "water cannons," as well as foams and other less familiar substances, are among the items of equipment used to extinguish a fire. Another important technique used during fire fighting efforts is proper ventilation.

Ventilation, in terms of fire fighting techniques, means to control the movement of air, smoke, as well as hot, flammable, and/or hazardous gases. Proper ventilation serves many purposes.

In the case of small fires ventilation is used to exhaust smoke so that minimal smoke damage occurs. Even with larger, more serious fires, exhausting smoke reduces the risk of personal injury to both fire fighters and any occupants in the structure. Furthermore, proper ventilation of a major fire removes hot air and combustible gases thus slowing the spread of the fire. It will also be appreciated that controlling the flow of air through a burning structure can have a direct effect on the direction the fire spreads and the intensity of the fire. Furthermore, fire fighters are often called to provide relief at the scene of "non-fire" emergencies where it is necessary to use ventilation equipment to exhaust toxic and/or flammable gases resulting from broken pipes, disrupted storage containers, or the like.

In order to provide proper ventilation at the scene of a fire or other emergency, nearly all fire fighting vehicles carry one or more portable ventilation fans.

Generally, fans used in fire fighting ventilation are self contained units which are carried from a fire fighting vehicle to the location where ventilation is needed. However, prior to the present invention, an individual fire fighter generally could not transport more than one fan and was faced with no other alternative but to hang the fan or place it on the floor, or whatever structures were available in the building, once the proper location was reached. Hanging the fan in a door or window also disadvantageously obstructs that opening.

As will be readily appreciated, it is not the most advantageous use of a ventilation fan to place it on the floor where the air flow is only directed parallel to the floor. Many times it is desirable to direct the air flow out of a window located above floor level or to direct the air flow towards the ceiling of a room. It may even be desirable to operate the fan in the middle of a flight of stairs with the air flow produced thereby being directed parallel to the stairs.

Since providing proper ventilation is important in a fire fighting effort, it would be a major advance in the art to provide a ventilation system which would allow a fire fighter to readily control the direction of a ventilation fan's air flow. It would also be an improvement in the art to provide a fire fighting ventilation system which is easily transported by one individual and which can accommodate more than one fan. It would also be an advance in the art to provide a fire fighting ventilation system which is compact and may be stored in the space normally allocated for storage of a single fan as well as being readily deployable on uneven surfaces.

OBJECTS AND BRIEF SUMMARY OF THE INVENTION

In view of the foregoing considerations, it is a primary object of the present invention to provide an efficient fire fighting ventilation system.

Another object of the present invention is to provide a fire fighting ventilation system which may be easily transported by an individual from an emergency vehicle to the location where it is needed.

It is another object of the present invention to provide a fire fighting ventilation system capable of incorporating more than one fan customarily used in the field.

Still another object of the present invention is to provide a fire fighting ventilation system which allows the air flow from the fan to be readily directed in any one of many directions.

Still another object of the present invention is to provide a fire fighting ventilation system which may be operated on uneven or sloping surfaces.

Yet another object of the present invention is to provide a fire ventilation system which can be compactly stored on emergency vehicles in a location generally reserved for ventilation fans.

These and other objects of the present invention will become more fully apparent during an examination of the following description taken in conjunction with the appended claims and the accompanying drawings.

The present invention allows fire fighters to make much more efficient use of ventilation fans by allowing an individual fire fighter to transport one or more fans from the fire fighting vehicle to the scene and then readily orient the fan or fans so that the air flow produced thereby is directed in any one of a plurality of directions (e.g., at any angle of inclination) rather than limiting the direction of air flow to the horizontal as is generally the case with fans placed directly on the floor.

In one embodiment of the present invention, a fan support frame is adapted to receive and securely hold a ventilation fan commonly used by fire fighters. Additional fans may be stacked upon the first fan as needed. Wheels are provided on the rear of the fan support frame to facilitate rolling the system on the ground.

Extending in an upward perpendicular direction from the rear of the fan support frame are a pair of variable length arms each having a first end attached to the fan support frame. The arms may be lengthened or shortened to accommodate the number of fans stacked upon the fan support frame and to facilitate the "aiming" of the fans.

Pivotally attached to each arm near its upper second end is an extendable rear leg. A variable length bracket and locking mechanism is provided on each arm and leg combination. By pivoting each leg an appropriate angular distance from its respective arm and by securing the leg in place using the variable length bracket and locking mechanism, the system may be oriented at any one of many angles of inclination so that the air flow is no longer directed horizontally but, for example, is directed out a window or towards the ceiling. The present invention allows air flow to be directed as appropriate, without obstructing openings such as doors or windows.

A front leg is provided on the front side of the fan support frame opposite to the arm and leg structures. The front leg is independently extensible. The front leg, in combination with the rear legs, provides that the ventilation system can be securely positioned on rough or uneven terrain such as stairs. A tube is also attached between the arms to provide additional rigidity to the structure and to provide a convenient handle.

DETAILED DESCRIPTION OF THE PRESENTLY PREFERRED EMBODIMENT

Figure 1:
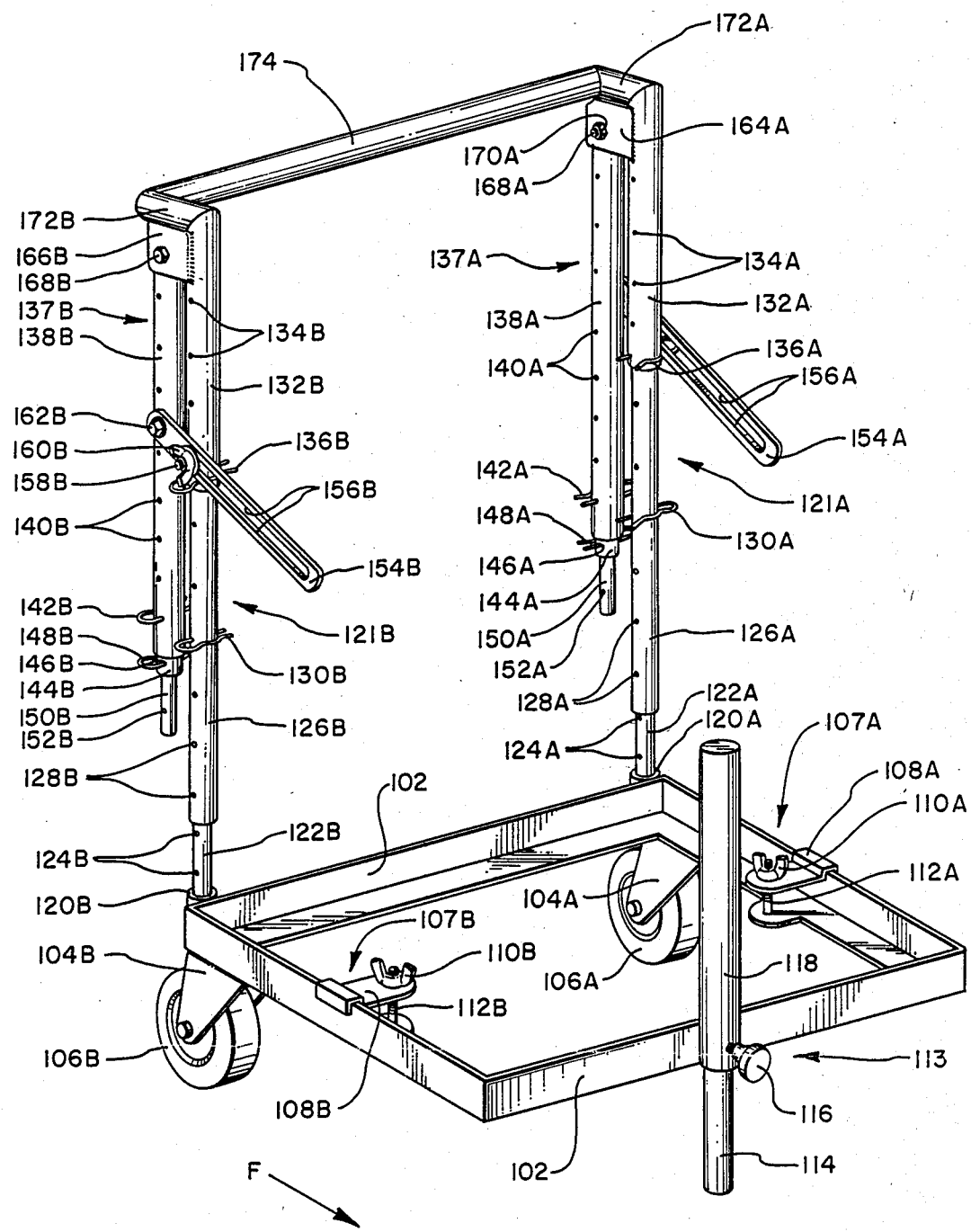
FIG. 1 is a perspective view of the presently preferred embodiment of the present invention.

It should be understood that the description of the presently preferred embodiment of the present invention which follows is merely representative of many possible embodiments and thus is not intended to limit the scope of the present invention. In the following description, like structures will be referred by similar numeric designations. In many cases the reference numerals used to identify two or more identical structures are provided with an "A" or a "B" suffix designation. When such is the case only one of the corresponding structures may be described with the understanding that the remaining structure is identical. Reference will now be made to FIG. 1, a perspective view of the presently preferred embodiment.

In FIG. 1, the overall structure of the presently preferred embodiment of the fire fighting ventilation system may be observed. As stated earlier, the present invention provides the great advantage of allowing an individual fire fighter to transport a plurality of ventilation fans from an emergency vehicle to the scene where the fans are needed. Furthermore, once the fans are in the proper position the present invention may be oriented so that the air flow from the fans is directed toward any location.

In this description, the terms "front" or "forward" will be used to describe the direction indicated by the arrow designated "F" in FIG. 1. Correspondingly, the term "rear" will be used to designate the direction opposite to arrow "F". The use of the terms front and rear are only intended to make this description of the preferred embodiment easily understandable and not to limit the scope of the present invention.

The terms "front" and "rear" are derived from the fact that in the illustrated embodiment, the air flow from the fans (illustrated generally in FIG. 2 at 10) is most often expected to be in the direction of arrow F. However, it should be noted that many ventilation fans presently available are capable of bidirectional operation. In some circumstances it may be desirable to direct the air flow in the direction opposite of arrow F.

As can be seen best in FIG. 1, the major structural components of the illustrated embodiment includes fan support frame 102, two arms generally designated 121A and 121B which are attached to the rear side of fan support frame 102 and extend upwardly from the fan support frame, and three legs. Two rear legs, generally designated 137A and 137B, are each pivotally attached to the upward end of one of arms 121A-B. A front leg, generally designated 113 in FIG. 1, is attached to the front of fan support frame 102. Each of the legs may be individually lengthened to provide firm contact with the ground at whatever angle of inclination the fans may be tilted.

The illustrated embodiment is for the most part preferably fabricated from a strong, light-weight material, such as aluminum tubing for the legs and arms and aluminum angled segments for the fan support frame. Those skilled in the art will readily be able to determine various techniques for fabricating the present embodiment as well as alternative materials for its construction.

Figure 2:
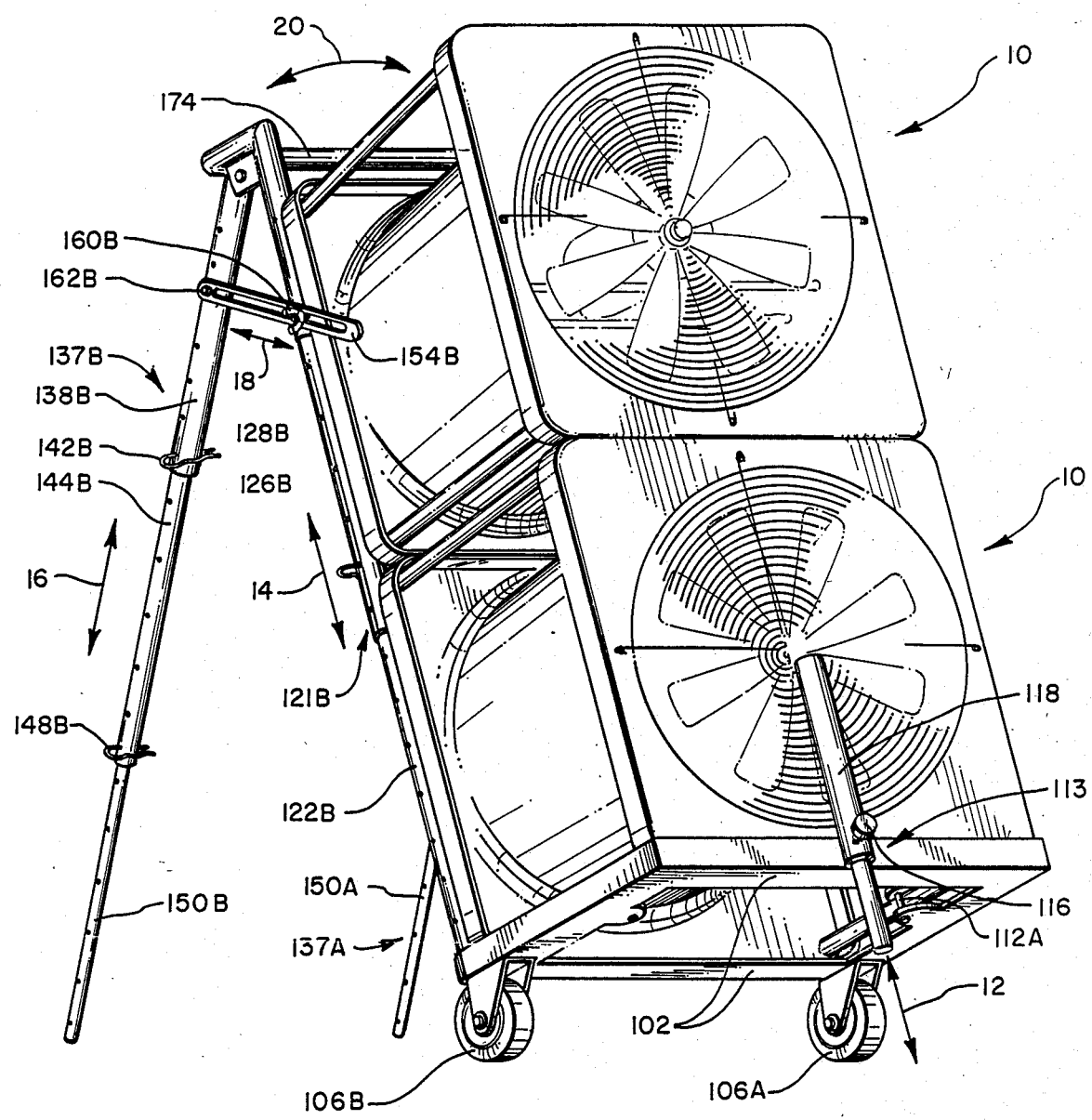
FIG. 2 is a perspective view of the presently preferred embodiment in an operational orientation and with two ventilation fans installed thereon.

Fan support frame 102 comprises four lengths of angle segments joined together to form a rectangle. Into frame 102 is received a fire fighting ventilation fan where it is held in place by the four sides of the frame as represented in FIG. 2. Other configurations may be devised for supporting other types of ventilation fans. For example, frame 102 could be designed to hold a circular fan by providing a cradle-type configuration.

Fan support frame 102 may be formed in many different shapes and sizes to facilitate receiving different styles and sizes of ventilation fans. The illustrated embodiment is adapted to receive the rectangular base of one model of ventilation fan customarily used by fire fighters.

It may also be desirable to attach one fan to the fan support frame by way of a clamping device. The clamping devices shown generally at 107A and 107B in FIG. 1 comprise an upper plate 108A-B which engages an edge of frame 102. When the base of the fan is placed in the support frame (as shown in FIG. 2), bolts 112A-B are inserted through the bores provided in top plates 108A-B and in frame 102 and nuts 110A-B are attached and tightened onto their respective bolts, thereby capturing and holding the base of the fan.

The apparatus illustrated in FIG. 1 is preferably dimensioned so that its width, length, and its "collapsed" height, are approximately the same as the width, height, and length of the ventilation fan with which it is used. Advantageously, this allows the apparatus and one ventilation fan to be stored at the location on an emergency vehicle, such as a fire fighting truck, which is normally allocated for storage of one ventilation fan. Thus, it is desirable that a single fan remain attached to the fan support frame by way of the clamping devices.

With a single fan attached to the fan support frame, a fire fighter may conveniently remove the present invention, with a single fan attached, from the vehicle after arriving at the scene of the emergency. Importantly, if it is necessary to utilize more than a single fan at the scene, the fire fighter may then gather additional fans and stack them on top of the fan attached to the fan support frame. In this way, an individual fire fighter may easily transport several fans.

As shown in FIG. 1, wheels 106A and 106B are attached on the bottom of the fan support frame by way of clevis-like structures 104A and 104B, respectively. The wheels should be of a type which are capable of supporting the weight of the expected load of fans as well as be able to withstand incurring any damage during severe use and in harsh environments. The wheels serve the important purposes of allowing the present invention to be easily moved and also assist with the "aiming" of the fan air flow as will be explained shortly.

Attached to the rear of the fan support frame are two support arms generally designated 121A and 121B. The support arms are constructed so that their length may be readily altered by a fire fighter at the scene of an emergency. In the embodiment illustrated in FIG. 1, support arms 121A-B are each comprised of three telescopic segments, a lowest arm segment 122A-B, a middle arm segment 126A-B, and an upper arm segment 132A-B.

Generally, when the present invention is being stored support arms 121A-B will be kept in their shortest configuration. However, as additional fans are stacked on the embodiment the support arms may be lengthened to match the height of the stacked fans. Thus, support arms 121A-B assist in keeping the fans in their place on the stack. However, if necessary, additional clamping devices (not shown in the figures) may be used to hold fans together. Varying the length of the support arms also increases the stability and versatility of the system when in use.

As illustrated in FIG. 1, the lower arm segments 122A-B, which also have the least diameter of the arm segments, are attached to the fan support frame by cups 120A and 120B which are preferably welded to the rear side of fan support frame 102 near its corners. Each of the support arm segments 122A-B, 126A-B, and 132A-B are provided with a plurality of bores 124A-B, 128A-B, and 134A-B, respectively, through their diameters at equally spaced intervals. Locking pins 130A-B and 136A-B are inserted through the bores of intersliding pairs of arm segments, thus allowing the support arms to be adjusted to any one of a number of lengths.

The locking pins are preferably of the illustrated "spring clip" type which will not be inadvertently disengaged from the intended bore during transportation or rough handling but yet are easily used and provide sure locking of the arm segments. While the arrangement illustrated in FIG. 1 is presently preferred, it will be appreciated that many different arrangements could be included in the present invention to provide support arms of variable length.

In FIG. 1, interconnecting tubes 172A-B and 174 are provided between the two uppermost telescopic segments of the support arms. Interconnecting tube 174 serves as a handle for the individual transporting the ventilation system and also provides additional rigidity to the support arms.

Also illustrated in FIG. 1 are rear support legs 137A and 137B which are each pivotally attached to support arms 121A and 121B, respectively, near the upper ends thereof. The pivot hinges shown in FIGS. 1 and 2 each comprise a pair of plates (two of the four plates shown at 164A and 166B in FIG. 1) attached to the support arm and bolts (168A and 168B) inserted through bores provided in the plates and through bores provided in the uppermost end of the support legs (not explicitly shown in the drawings). Bolts 168A-B are held in place by nuts (one shown at 170A). The illustrated hinge arrangement allows the angle (and the distance) between the legs and arms to vary.

Similar to the working of the arms which was earlier described, rear support legs 137A-B are comprised of three telescopic segments, a lower leg segment 150A-B, a middle leg segment 144A-B, and an upper leg segment 138A-B. Each of the rear legs are provided with a plurality of bores 152A-B, 146A-B, and 140A-B, respectively, through the segment diameters at regular intervals. As with support arms 121A-B, the length of the support legs is fixed by inserting locking pins 142A-B and 148A-B through the appropriate bores.

Once the support legs are placed at the desired angle (i.e., the fans are at the desired angle of inclination) variable length brackets 154A and 154B are locked into place to hold the legs at the desired angle. In the presently preferred embodiment, the variable length brackets are comprised of an elongated length of metal 154A-B with a slot 156A-B formed along the center of its length. A bore is provided at one end which is pivotally attached to the corresponding support leg, as illustrated in FIG. 1, by way of bolts, one of which is shown at 162B.

Similarly, bolts, one of which is shown at 158B, is attached to the uppermost segment of the arm and is situated in the slot. By tightening the nuts, one of which is shown at 160B, associated with the respective bolts, the length of the bracket and the angle of the support leg may be fixed. While the variable length bracket shown in the figures is presently preferred, those skilled in the art will appreciate that many different structures can be devised to perform the function of the variable length bracket.

In order to provide additional stability, a front adjustable length leg is also provided as is shown best in FIG. 1. In the presently preferred embodiment, front leg 113 comprises an outer case 118 which is attached to the front of the fan support frame and which is provided with a thumbscrew 116 inserted through a threaded bore (not explicitly shown) on the circumference of the outer case.

A leg segment 114 is disposed within outer case 118 and may be inserted into or withdrawn from the outer case until the leg is the desired length. The thumbscrew may then be tightened and the front leg, in cooperation with the two rear legs, will provide a fire fighting ventilation system which is positionally stable on uneven or inclined surfaces.

As can be seen best in FIG. 2, the inclusion of variable length legs is very advantageous. The angle of inclination (as indicated by arrow 20) may be set by fixing the length of the brackets (as indicated by arrow 18) and the length of the support legs may be adjusted (as indicated by arrow 16) to maintain the angle of desired inclination on any type of terrain. Importantly, the legs and brackets may be independently adjusted to facilitate positioning the ventilation system on uneven surfaces. As mentioned previously, the support arms may also be lengthened or shortened (as indicated by arrow 14) as needed. Front leg 113 may also be lengthened or shortened as indicated by arrow 12.

Also, as mentioned earlier, the inclusion of wheels assist with the orientation of the system at the proper angle of inclination by making the "tilting" of the system by an individual easier.

With an understanding of the features of the presently preferred embodiment of the fire fighting ventilation system, it will be appreciated that the present invention is a great advance over previously available ventilation systems. By use of the present invention, the direction of air flow from ventilation fans may be easily directed in any number of directions. Also, the present invention allows an individual to easily transport one or more fans from an emergency vehicle to the scene of the emergency. Furthermore, the present invention may be used with fire fighting ventilation fans commonly in use and may be stored on an emergency vehicle in a location normally reserved for such fans. Still further, the present invention may be used on uneven or sloping surfaces and still provide very stable positioning of fire fighting ventilation fans.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for supporting and transporting fire fighting ventilation equipment which is readily deployable on uneven surfaces comprising:
   a fan support frame adapted to receive and hold a fire ventilation fan;
   two wheels attached to the support frame;
   first, second, and third extensibly adjustable means for supporting the fan support frame, each said means comprising a means for extending the length thereof independent of one another, and each said adjustable support means being spaced one from another thereby forming a tripod to enhance stable placement of the fan support frame on uneven surfaces without the need for support by said wheels, at least one of said extensibly adjustable support means providing stabilizing support on the front of said fan support frame to assist in retaining the ventilation fan on the fan support frame; and
   first and second angularly adjustable means provided on at least two of said extensibly adjustable support means for independently adjusting and maintaining a desired angular distance between the at least two of said extensibly adjustable support means and the fan support frame.

2. An apparatus for supporting and transporting fire fighting ventilation equipment as defined in claim 1 further comprising clamping means for clamping the ventilation fan to the fan support frame.

3. An apparatus for supporting and transporting fire fighting ventilation equipment as defined in claim 1 further comprising an extendable arm means attached at a first end to the support frame and projecting perpendicularly therefrom for providing a vertically adjustable handle.

4. An apparatus for supporting and transporting fire fighting ventilation equipment as defined in claim 3 wherein the extendable arm means comprises a telescoping arm including a plurality of arm segments slidably engaging each other and further comprising means for locking the arm segments at any one of the plurality of lengths.

5. An apparatus for supporting and transporting fire fighting ventilation equipment as defined in claim 4 wherein the means for locking the arm segments comprises a plurality of holes provided in the plurality of arm segments and a pin adapted for insertion through one of the holes.

6. An apparatus for supporting and transporting fire fighting ventilation equipment as defined in claim 3 wherein said extendable arm means comprises two extendable arms attached at their first end to the support means and projecting perpendicularly therefrom.

7. An apparatus for supporting and transporting fire fighting ventilation equipment as defined in claims 3 or 6 wherein at least two of said extensibly adjustable means comprise a first end connected to the extendable arm means.

8. An apparatus for supporting and transporting fire fighting ventilation equipment as defined in claim 7 wherein said at least two extensibly adjustable means further comprise a telescoping leg including a plurality of segments slidably engaging each other and means for holding the leg at a fixed angle with respect to the arm means.

9. An apparatus for supporting and transporting fire fighting ventilation equipment as defined in claim 8 wherein the telescoping leg is provided with means for locking the leg at any one of a plurality of lengths.

10. An apparatus for supporting and transporting fire fighting ventilation equipment as defined in claim 1 wherein the first, second, and third extensibly adjustable means comprise, respectively:
    two rearwardly positioned extendable legs; and
    a forwardly positioned extendable leg attached to the support frame.

11. An apparatus for supporting and transporting fire fighting ventilation equipment as defined in claim 10 wherein the two rearwardly positioned extendable legs comprise a plurality of segments slidably engaging each other, said rearwardly positioned extendable legs being associated with the first and second independently angularly adjustable means.

12. An apparatus for supporting and transporting fire fighting ventilation equipment as defined in claim 11 wherein the two rearwardly positioned extendable legs are provided with means for locking the legs at any one of a plurality of lengths.

13. An apparatus for transporting at least one fire fighting ventilation fan and orienting the direction of air flow from said ventilation fan which is readily deployable on uneven surfaces comprising:
    a fan support frame configured to receive at least one ventilation fan, the fan support frame having a first side and an opposing second side;
    first and second variable length arms, each arm having a first end attached to the first side of the fan support frame and extending in a direction substantially perpendicular to the fan support frame;
    first and second independently extendable legs, each leg comprising a means to permit pivotal adjustment and securement at a first end thereof to a corresponding variable length arm at a location adjacent to a second end of the variable length arms so as to permit independent angular adjustment of each said extendable leg;
    a third independently extendable leg attached to the second side of the fan support frame for providing stabilizing support on the second side of the fan support frame to assist in retaining the ventilation fan on the support frame, said independently extendable legs permitting stable placement of the fan support frame on uneven surfaces; and
    at least two wheels supporting the apparatus whereby the apparatus may be rolled to a location and any desired orientation of the ventilation fans assumed and maintained by extending the first, second, and third legs to contact the surface underlying the apparatus.

14. An apparatus as defined in claim 13 wherein the fan support frame comprises a rectangular support frame adapted to receive the base of the ventilation fan.

15. An apparatus as defined in claim 14 further comprising clamping means for clamping the ventilation fan to the fan support frame.

16. An apparatus as defined in claim 13 wherein said first and second variable length arms each comprise a telescoping arm including a plurality of arm sections slidably engaging each other and further comprising means for locking the arm sections in any one of a plurality of lengths.

17. An apparatus as defined in claim 16 wherein the means for locking the arm sections comprises a plurality of equally spaced holes provided in the plurality of arm sections and a pin inserted through at least one pair of the holes.

18. An apparatus as defined in claim 13 wherein the first, second, and third independently extendable legs each comprise a telescoping leg including a plurality of sections slidably engaging each other.

19. An apparatus as defined in claim 18 wherein the telescoping leg is provided with means for locking the leg at any one of a plurality of lengths.

20. An apparatus for transporting and aiming a fire fighting ventilation fan which is readily deployable on uneven surfaces comprising:
- a fan support frame adapted to receive and hold a ventilation fan;
- two wheels attached to the support frame;
- first and second extendable arms attached to the fan support frame and extending substantially perpendicularly from the fan support frame;
- a member interconnecting the first and second extendable arms;
- first and second extendable legs hinged at a first end thereof to the first and second arms, respectively;
- a third extendable leg attached to the fan support frame in a position substantially opposing the first and second legs, said third extendable leg having a sufficient height to provide stabilizing support on the front of said fan support frame to assist in retaining the ventilation fan on the fan support frame, said first, second, and third extendable legs being independently vertically adjustable and spaced one from another thereby forming a tripod support, said tripod support permitting stable placement of the fan support frame on uneven surfaces without the need for support by said wheels; and
- means for maintaining the desired angular distance between the first and second legs and their respective arms, said means being independently angularly adjustable and associated with the first and second extendable legs such that the first and second extendable legs are also angularly adjustable.

21. An apparatus as defined in claim 20 wherein the fan support frame comprises a rectangular frame adapted to receive the base of the ventilation fan.

22. An apparatus as defined in claim 21 further comprising clamping means for clamping the ventilation fan to the fan support frame.

23. An apparatus as defined in claim 20 wherein the first and second extendable arms each comprise telescoping arms including a plurality of arm sections slidably engaging each other and further comprising means for locking the arms in any one of a plurality of lengths.

24. An apparatus as defined in claim 23 wherein the means for locking the arms comprises a plurality of holes provided in the plurality of arm sections and a pin adapted for insertion through one pair of the holes for each pair of arm sections.

25. An apparatus as defined in claim 20 wherein the first and second legs comprise telescoping legs including a plurality of sections slidably engaging each other.

26. An apparatus as defined in claim 25 wherein the first and second legs each are provided with a plurality of equally spaced bores adapted to receive a pin thereby locking the leg at one of a plurality of lengths.

27. An apparatus as defined in claim 20 wherein the means for maintaining the desired angular distance comprises a first and a second slidable bracket connected between the first arm and first leg and the second arm and second leg, respectively.

* * * * *